(12) United States Patent
Bae

(10) Patent No.: US 7,711,316 B2
(45) Date of Patent: May 4, 2010

(54) SPEAKER CONTROL IN A MOBILE STATION

(75) Inventor: Sung-Ho Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 316 days.

(21) Appl. No.: 11/301,468

(22) Filed: Dec. 12, 2005

(65) Prior Publication Data

US 2006/0128321 A1    Jun. 15, 2006

(30) Foreign Application Priority Data

Dec. 13, 2004    (KR) ........................... 2004-1051112

(51) Int. Cl.
H04H 40/00    (2008.01)

(52) U.S. Cl. ..................... 455/3.06; 455/567; 455/569.1

(58) Field of Classification Search ............. 455/569.1, 455/569.2, 530.1, 513.1, 90.1, 90.2, 90.3, 455/575.6, 575.8, 567
See application file for complete search history.

(56) References Cited

U.S. PATENT DOCUMENTS

| | | | |
|---|---|---|---|
| 4,221,006 A * | 9/1980 | Weintraub et al. ........... | 455/355 |
| 4,687,457 A | 8/1987 | Milner | |
| 5,170,499 A * | 12/1992 | Grothause ................ | 455/238.1 |
| 6,201,554 B1 | 3/2001 | Lands | |
| 6,411,828 B1 * | 6/2002 | Lands et al. ............. | 455/569.1 |
| 6,853,850 B2 * | 2/2005 | Shim et al. ............... | 455/550.1 |
| 6,998,966 B2 * | 2/2006 | Pedersen et al. ......... | 340/384.1 |
| 7,103,393 B2 * | 9/2006 | Hwang .................... | 455/569.1 |

FOREIGN PATENT DOCUMENTS

| | | |
|---|---|---|
| DE | 10231570 A1 | 1/2001 |
| EP | 0973138 A | 1/2000 |
| EP | 1104143 A | 5/2001 |
| JP | 6007400 U | 1/1994 |
| JP | 2003-199973 | 7/2003 |
| JP | 2004056408 | 2/2004 |
| JP | 2004-337619 | 12/2004 |

* cited by examiner

Primary Examiner—Charles N Appiah
Assistant Examiner—Joy K Contee
(74) Attorney, Agent, or Firm—Lee, Hong & Degerman, Kang & Waimey

(57) ABSTRACT

A method for controlling speakers in a mobile station comprises detecting a movement of the mobile station. The method also comprises differentially controlling sound output by the speakers based on the detected movement of the mobile station. The differentially controlling the sound output by the speakers based on the detected movement of the mobile station may comprise at least one of adjusting a sound volume and selecting a sound effect. The detecting the movement of the mobile station may comprise detecting a tilt of the mobile station.

6 Claims, 2 Drawing Sheets

SPEAKER CONTROL IN A MOBILE STATION

CROSS-REFERENCE TO RELATED APPLICATIONS

Pursuant to 35 U.S.C. §119(a), this application claims the benefit of earlier filing date and right of priority to Korean Application No. 2004-0105112, filed on Dec. 13, 2004, the contents of which are hereby incorporated by reference herein in their entirety.

FIELD OF THE INVENTION

The present invention relates generally to a mobile station and, more particularly, to speaker control in a mobile station.

BACKGROUND OF THE INVENTION

Mobile stations may be equipped with stereo speakers for use in various applications. Such stereo speakers may operate in conjunction with a tilt sensor or position detecting sensor, to enhance three-dimensional (3D) game applications, for example.

However, even if various applications using a tilt sensor or a position detecting sensor are provided in a mobile station, a technique for controlling a stereo speaker by using the tilt sensor or the position detecting sensor is not provided. Thus, control of stereo speakers that operate in conjunction with a tilt sensor or position detecting sensor is needed.

SUMMARY OF THE INVENTION

Accordingly, the present invention is directed to speaker control in a mobile station that substantially obviates one or more problems due to limitations and disadvantages of the related art.

An object of the present invention is to provide control of a speaker (e.g., a stereo speaker), that operates in conjunction with a tilt sensor and/or a position detecting sensor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method for controlling speakers in a mobile station comprises detecting a movement of the mobile station. The method also comprises differentially controlling sound output by the speakers based on the detected movement of the mobile station.

The differentially controlling the sound output by the speakers based on the detected movement of the mobile station may comprise at least one of adjusting a sound volume and selecting a sound effect. The detecting the movement of the mobile station may comprise detecting a tilt of the mobile station.

The differentially controlling the sound output by the speakers based on the detected movement of the mobile station may also comprise selecting a volume level based on the detected movement of the mobile station, controlling sound signals based on the selected volume level, and outputting the controlled sound signals to the speakers. The sound signals may comprise at least one of voice signals and acoustic signals. The method may further comprise adjusting animation displayed on the mobile station based on the detected movement of the mobile station.

In another embodiment, a method for controlling audiovisual output in a mobile station comprises detecting a movement of the mobile station, differentially controlling sound output by mobile station speakers based on the detected movement of the mobile station, and adjusting animation displayed on the mobile station based on the detected movement of the mobile station.

In yet another embodiment, a control apparatus adapted to control speakers in a mobile station comprises a tilt sensor adapted to detect a tilt of the mobile station, and a volume selecting unit operatively coupled to the tilt sensor, adapted to select a volume level based on the detected tilt and to output the volume level. The control apparatus also comprises a sound signal generating unit adapted to generate sound signals, and a volume controlling unit operatively coupled to the volume selecting unit and the sound signal generating unit, adapted to differentially control the sound signals generated by the sound signal generating unit based on the volume level outputted from the volume selecting unit.

The control apparatus may further comprise speakers operatively coupled to the volume controlling unit, adapted to output the differentially controlled sound signals from the volume controlling unit. The speakers may be respectively positioned at right and left sides of a hinge portion on the mobile station. The speakers may be stereo speakers.

The volume controlling unit may comprise a voltage controlling amplifier. The tilt sensor may comprise a position detecting sensor. The volume selecting unit may store volume levels associated with various tilts of the mobile station.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, in which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The term 'mobile station' encompasses mobile phones, handsets, PDAs (personal digital assistants), and computers, as well as any other devices with wireless communication capabilities. A mobile station including a tilt sensor and/or a position detecting sensor, as well as speakers (e.g., stereo speakers) is described below. A stereo speaker is controlled using a tilt sensor and/or a position detecting sensor mounted in a mobile station. The stereo speakers may be differentially controlled to provide a stereo effect in response to tilting of the mobile station. The tilting of the mobile station may also cause animation (e.g., game animation) displayed on the mobile station to be adjusted accordingly.

Figure 1:
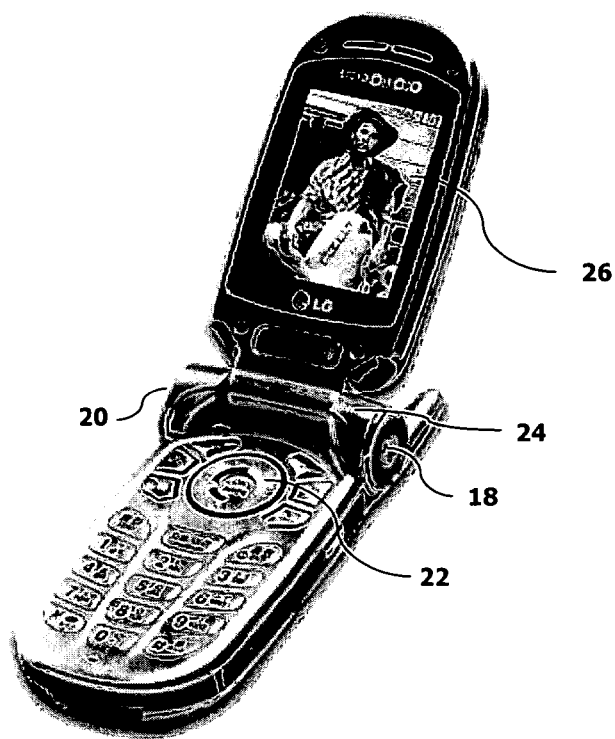
FIG. 1 is a perspective view illustrating a mobile station having stereo speakers.
Figure 2:
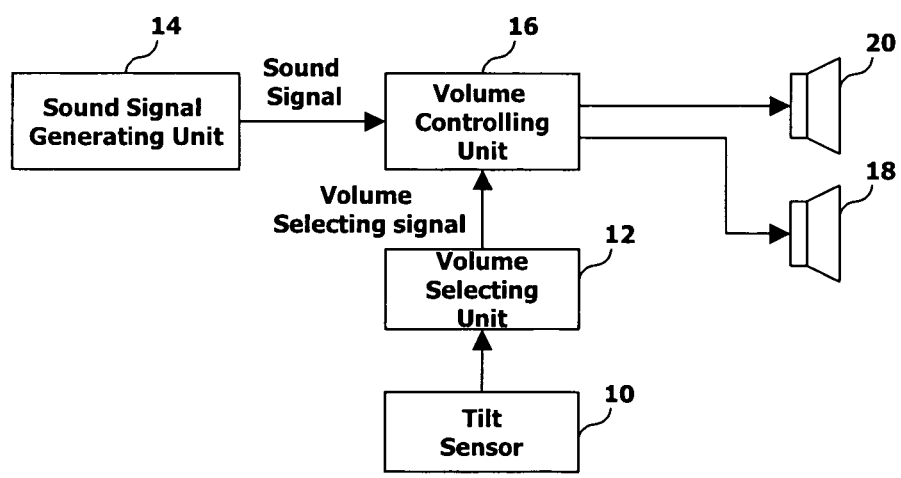
FIG. 2 is a block diagram illustrating an apparatus for controlling a stereo speaker in a mobile station, according to an embodiment of the present invention.

FIG. 1 is a perspective view illustrating a mobile station having stereo speakers. FIG. 2 is a block diagram illustrating an apparatus for controlling a stereo speaker in a mobile station, according to an embodiment of the present invention.

Referring to FIGS. 1 and 2, an apparatus for controlling a stereo speaker (control apparatus) in a mobile station includes a tilt sensor 10 for detecting a tilt of a mobile station, and a volume selecting unit 12 for selecting and outputting a volume level corresponding to a tilt detected from the tilt sensor 10. Alternatively, the volume selecting unit may select a type of sound effect to be output from each speaker. The control apparatus also includes a sound signal generating unit 14 for generating a sound signal, and a volume controlling unit 16 for differentially controlling volumes of sound signals to be outputted to first and second stereo speakers 18 and 20, according to the volume level outputted from the volume selecting unit 12. Reference numerals 22 and 26 denote a key inputting unit and a main LCD, respectively. The sound signal may include a voice signal and/or an acoustic signal.

The two stereo speakers 18 and 20 are respectively positioned at right and left sides of a hinge portion 24. The volume controlling unit 16 may be a voltage controlling amplifier, for example. As indicated above, a position detecting sensor may be used in place of the tilt sensor 10.

Figure 3:
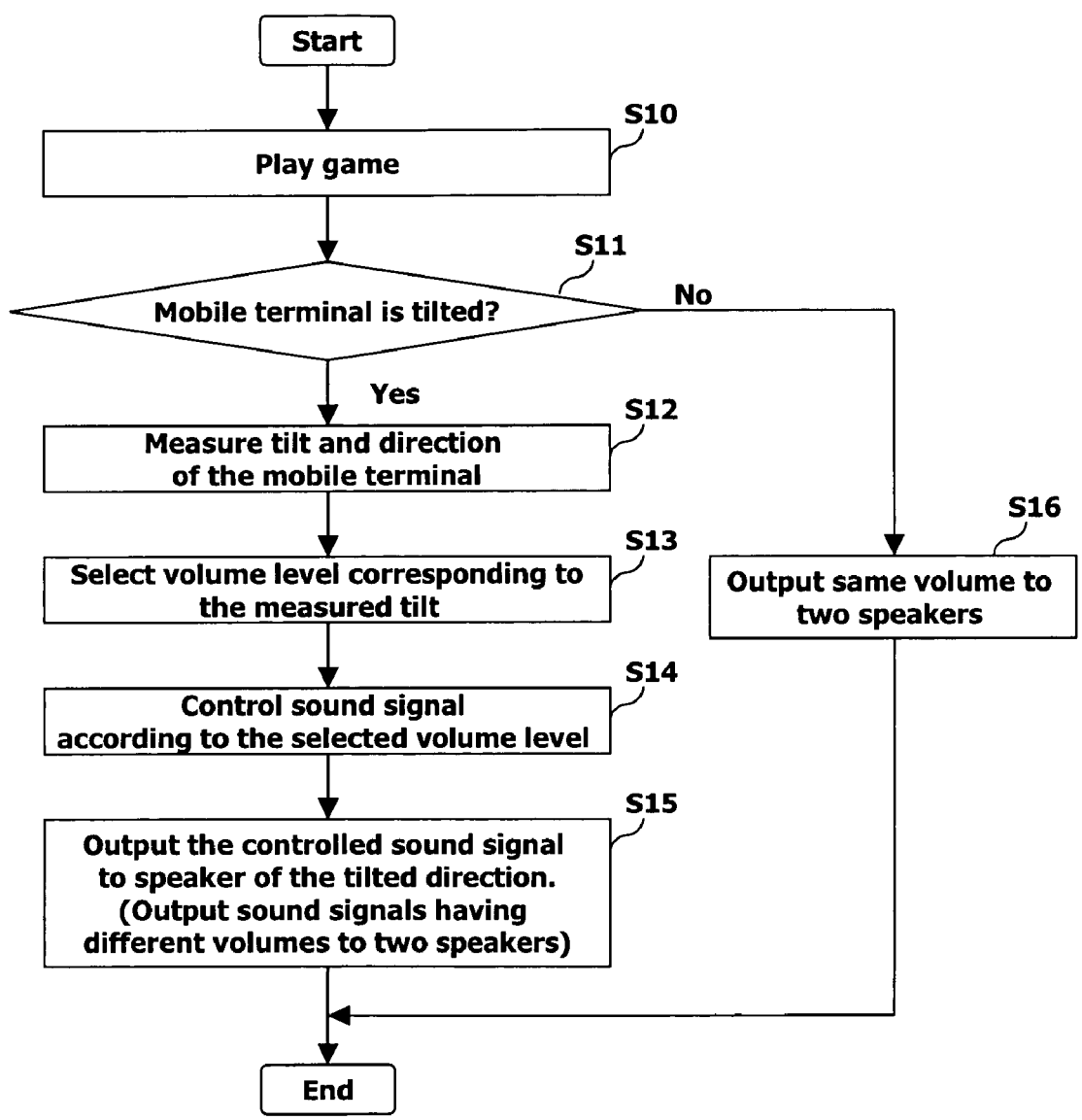
FIG. 3 is a flow diagram illustrating a method for controlling a stereo speaker in a mobile station, according to an embodiment of the present invention.

FIG. 3 is a flow diagram illustrating a method for controlling a stereo speaker in a mobile station, according to an embodiment of the present invention. Operation of the control apparatus is described below with reference to FIGS. 1-3.

A user may select a game, such as a three-dimensional racing game for example, on the main LCD 26 using the key inputting unit 22. The user may then control movement of game animation by tilting the mobile station. Thus, when the user tilts the mobile station to the left, for example, the game animation is adjusted accordingly. To this end, the tilt sensor 10 measures a tilt and a direction of the mobile station and outputs tilt and direction values to the volume selecting unit 12 (S11-S12). The volume selecting unit 12 then selects a volume level or sound effect to be outputted to the stereo speakers 18 and 20 based on the inputted tilt and direction values (S13) and outputs the selected volume level to the volume controlling unit 16. The volume selecting unit 12 may store the volume level or sound effect corresponding to the tilt and direction values of the mobile station in a tabular form, for example. The volume controlling unit 16 then differentially controls volumes of sound signals to be outputted from the sound signal generating unit 14 based on the volume levels outputted from the volume selecting unit 12 (S14), and outputs corresponding volumes to the stereo speakers 18 and 20 (S15).

Accordingly, a louder sound may be generated from a stereo speaker 18 or 20 in a tilted direction, while a softer sound may be generated from a stereo speaker 18 or 20 that is not in the tilted direction. When the mobile station is not being tilted, the volume controlling unit 16 may equally control volumes of sound signals to be outputted to the stereo speakers 18 and 20 based on the volume level outputted from the volume selecting unit 12.

In one embodiment, a method for controlling speakers in a mobile station comprises detecting a movement of the mobile station. The method also comprises differentially controlling sound output by the speakers based on the detected movement of the mobile station.

The differentially controlling the sound output by the speakers based on the detected movement of the mobile station may comprise at least one of adjusting a sound volume and selecting a sound effect. The detecting the movement of the mobile station may comprise detecting a tilt of the mobile station.

The differentially controlling the sound output by the speakers based on the detected movement of the mobile station may also comprise selecting a volume level based on the detected movement of the mobile station, controlling sound signals based on the selected volume level, and outputting the controlled sound signals to the speakers. The sound signals may comprise at least one of voice signals and acoustic signals. The method may further comprise adjusting animation displayed on the mobile station based on the detected movement of the mobile station.

In another embodiment, a method for controlling audio-visual output in a mobile station comprises detecting a movement of the mobile station, differentially controlling sound output by mobile station speakers based on the detected movement of the mobile station, and adjusting animation displayed on the mobile station based on the detected movement of the mobile station.

In yet another embodiment, a control apparatus adapted to control speakers in a mobile station comprises a tilt sensor adapted to detect a tilt of the mobile station, and a volume selecting unit operatively coupled to the tilt sensor, adapted to select a volume level based on the detected tilt and to output the volume level. The control apparatus also comprises a sound signal generating unit adapted to generate sound signals, and a volume controlling unit operatively coupled to the volume selecting unit and the sound signal generating unit, adapted to differentially control the sound signals generated by the sound signal generating unit based on the volume level outputted from the volume selecting unit.

The control apparatus may further comprise speakers operatively coupled to the volume controlling unit, adapted to output the differentially controlled sound signals from the volume controlling unit. The speakers may be respectively positioned at right and left sides of a hinge portion on the mobile station. The speakers may be stereo speakers.

The volume controlling unit may comprise a voltage controlling amplifier. The tilt sensor may comprise a position detecting sensor. The volume selecting unit may store volume levels associated with various tilts of the mobile station.

The present invention provides for differential control of stereo speakers in a mobile station based on movements of the mobile station, such as tilting. The movement of the mobile station may also cause animation displayed on the mobile station to be adjusted accordingly. The present invention may utilize a tilt sensor and/or a position detecting sensor.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method for controlling speakers in a mobile station, the method comprising:

outputting a sound signal via a first speaker and a second speaker, wherein the first speaker and the second speaker are provided on opposite sides of the mobile station;

detecting a tilt and tilt direction of the mobile station;

selecting a volume level to be output to at least the first speaker or the second speaker according to the detected tilt direction of the mobile station; and controlling a volume of the output of the sound signal via the first speaker and the second speaker according to the detected tilt direction of the mobile station and the selected volume level, wherein the volume of the output of the sound signal via the first speaker is increased if the mobile station is tilted in an upper direction and the volume of the output of the sound signal via the second speaker is decreased if the mobile station is tilted in a lower direction.

2. The method of claim 1, further comprising:

displaying an animation on a display unit of the mobile station; and adjusting the animation displayed on the mobile station according to the detected tilt direction of the mobile station.

3. A control apparatus adapted to control speakers in a mobile station, the control apparatus comprising:

a tilt sensor adapted to detect a tilt of the mobile station;

first and second speakers respectively provided at a right side and a left side of the mobile station adapted to output a sound signal;

a controller adapted to select a volume level or a sound effect to be output to at least one of the first speaker or the second speaker according to the detected tilt direction of the mobile station;

and further adapted to increase the volume of the output of the sound signal from the first speaker when tilted in an upper direction and decrease the volume of the output of the sound signal from the second speaker when tilted in a lower direction, the controller controls the increase or decrease of the volume of the output of the sound signal from the first speaker or the second speaker respectively according to the selected volume level or the sound effect.

4. The control apparatus of claim 3, wherein the controller comprises a voltage controlling amplifier.

5. The control apparatus of claim 3, wherein the tilt sensor comprises a position detecting sensor.

6. The control apparatus of claim 3, wherein the controller stores volume levels associated with various tilts of the mobile station.

* * * * *